United States Patent Office 3,379,503
Patented Apr. 23, 1968

3,379,503
PROCESS FOR PREPARING TUNGSTEN MONOCARBIDE
Philip Mowry McKenna, Greensburg, Pa., assignor to Kennametal Inc., Latrobe, Pa., a corporation of Pennsylvania
Filed Nov. 12, 1965, Ser. No. 507,476
10 Claims. (Cl. 23—208)

ABSTRACT OF THE DISCLOSURE

Tungsten monocarbide (WC) is produced by reaction of a charge of tungsten ore, metallic aluminum and calcium carbide meeting certain critical conditions. First, the charge contains a tungsten ore containing from about 24 to 80 weight percent of tungsten by analysis, from 0.2 to 0.4 pound of calcium carbide per pound of tungsten in the charge, from about 0.35 to 1.6 pounds of particulate metallic aluminum per pound of tungsten in the charge, and up to 3.5 pounds of iron oxide of average 30 percent oxygen content per pound of tungsten in the charge, and within those ranges the reactants are proportioned to develop a self-sustained exothermic reaction of at least about 4450° F. as determined by calculation based upon the high temperature heat contents of WC, the reactants and the reaction products, using standard thermochemical data. Second, the batch is divided into portions of substantially uniform weight which are charged progressively to bring the charge and the reaction products to and maintain them at that temperature. Third, loss of heat from the reaction body is minimized during the reaction, and fourth it is essential that a reducing condition exist at the completion of the reaction, i.e. there must remain an excess of calcium carbide and metallic aluminum. At the end of the reaction the mass is cooled and a lower, heavier layer of crystal mass is separated from an upper slag layer. The use of a small amount of elemental carbon may be desirable to insure complete conversion of W to WC. The crystal mass is crushed, washed with water to remove residual calcium carbide, and treated with solvents of free iron, manganese and aluminum with production of crystalline WC containing not over about 2 percent of iron, which can be lowered to about 0.2 percent by treating with an appropriate solvent.

---

This invention relates to the production of crystalline single phase tungsten monocarbide (WC).

Various ores are used to produce tungsten powder for conversion to tungsten carbides. In general these ores are of such low tungsten content that they are subjected to mechanical concentration to increase the tungsten content to a point where they can be treated economically for recovery of tungsten metal. Typical ores are scheelite, $CaWO_4$, and scheelite-powellite minerals which carry minor proportions of molybdenum replacing tungsten atoms, i.e., $CaW(Mo)O_4$, and cuproscheelite $$Ca(Cu)WO_4$$

which are known as white ores of tungsten. Others include ferberite, $FeWO_4$, hubnerite, $MnWO_4$, and wolframite, $Fe(Mn)WO_4$, the most plentiful, which are known as black ores of tungsten. Heretofore various processes of a lengthy and complicated chemical nature have been required for producing tungsten metal powders from such ores, and the known procedures applicable to black ores are not applicable to the white ores, and vice versa.

The production of tungsten metal powder of special particle size and purity has, since the beginning of the cemented tungsten carbide industry about thirty years ago and right up to the present, been the first stage in making the main ingredient of such carbide products, known as tungsten carbide, WC, desirably approaching the stoichiometric percentage 6.13% carbon, from which pratically all commercial cemented tungsten carbide products have been made.

Up to the present the almost universal practice for producing tungsten carbide for hard metal compositions has been to subject tungsten metal powder to carburization with finely divided carbon at about 3000° F.; tungstic oxide or tungstic acid can be used in place of tungsten powder. Another possible procedure is carbon reduction of wolframite or scheelite to produce WC but this is not productive of carbide suited for the manufacture of cemented hard metals because the product always contains ditungsten carbide ($W_2C$) which is objectionable because such compositions are not suited to the production of cemeted hard metal carbides for which tungsten carbide should be essentially free from $W_2C$.

The technical literature is full of references to the impracticability of employing in hard metal compositions WC made in ways other than the direct reaction of W metal powder, $WO_3$ or $H_2WO_4$ with C. Also, despite proposals to convert tungsten minerals directly to WC it was asserted prior to this invention that it was not practicable or practical to do so.

In the prior art carburizing tungsten metal powder by reaction with carbon was the most widely practiced way of providing tungsten carbide for such tungsten carbide hard compositions as are designated by the trade names Widia, Carboloy, Firthite, and Kennametal.

It has been recognized that the presence of molybdenum in the tungsten metal powder from which tungsten carbide, WC, has been universally prepared by carburization with, for example, carbon black, yields physically inferior hard metal sintered compositions and the inferiority has been ascribed to the formation of $Mo_2C$ as a phase distinct from WC which makes for brittleness and un-uniform sintered hard metal. With macrocrystalline WC made by my present process, molybdenum up to 3% by weight may replace W atom for atom in the WC crystal lattice, i.e., accounting for one atom of carbon for each atom of W plus Mo present, as a single phase W(Mo)C and the harmful effects of $Mo_2C$ are avoided in the sintered compositions.

It is among the objects of this invention to provide a process of making WC in macrocrystalline single phase form in the practice of which the production of $W_2C$ and $Fe_3W_3C$, which are referred to in the tungsten carbide art as under-carburized tungsten compounds, is suppressed.

Another object is to provide such a process which is applicable to concentrates of either black ores or white ores, or to mixtures of them, as well as to synthetic tungsten compounds such as artificial scheelite (calcium tungstate).

A further object is to provide a process for the thermochemical treatment of such tungsten sources for direct conversion of their tungsten contents in one operation to macrocrystalline tungsten monocarbide.

Still another object is to provide a process which results in conversion to WC of at least 85% of the tungsten contained in tungsten sources of the types referred to, and from the reaction products of which WC characteristic of the invention may be recovered by simple processing without prolonged chemical treatment, as refined macrocrystalline WC containing not over about 1 weight percent of iron.

Yet another object is to provide macrocrystalline WC containing not over 1 percent of iron.

A still further object is to provide a process in accordance with the foregoing objects which is productive of maximum conversion of the tungsten content of tungsten sources such as those referred to above to macrocrystalline WC with strictly minimized production of $W_2C$ and other under-carburized compounds such as those of $M_3W_3C$ type, such as $Fe_3W_3C$.

Yet another object is to provide a process in accordance with the foregoing objects that is applicable to scheelite and other tungsten minerals containing molybedenum to product single phase macrocrystalline WC containing not over about 3 percent of molybdenum substituted isomorphously in the WC lattice as a phase W(Mo)C which is productive of cemented hard metal carbide compositions of excellent physical properties.

Still another object is to provide a method in accordance with the foregoing objects by which tungsten sources such as those referred to are converted to macrocrystalline WC by a self-sustaining reducing reaction without the need for extraneous heat supply.

The invention will be described with reference to the accompanying drawings of which

Other objects will appear from the following specification.

The invention is predicated upon my discovery that its stated objects are attained by thermochemical reduction of tungsten ores, minerals, their concentrates, artificially produced tungstates, and other tungsten sources with metallic aluminum and calcium carbide under certain specified and critical conditions. In other words, I have found that macrocrystalline WC is produced in this manner provided certain essential conditions are observed.

First, the charge must be so proportioned as to undergo a self-sustained reaction that develops a temperature such that the charge constituents effect reduction of the tungsten values of the charge with production of macrocrystalline WC and with maximum suppression of formation of $W_2C$ and other undercarburized tungsten compounds. This may be defined as the operative temperature. To this end it is essential that all of the heat needed to bring the reactants and the reaction products to this temperature, or temperature range, be liberated within the charge by the exothermic reactions involved. This operative temperature cannot be determined directly.

What I term the operative temperature is calculated in the manner described and using the data given hereinafter. This calculated operative temperature is not necessarily the actual temperature prevailing in the kiln but the use of it in the way described accomplishes the objects of the invention.

However, based upon numerous successful large scale operations productive of results in accordance with the objects of the invention, it has been demonstrated that attainment of the critical operative temperature can be predicted from calculations based upon thermochemical principles. More in detail, it can be said that based upon the high temperature heat contents of WC, the reactants and the reaction products of a large number of wholly successful runs involving charges of many tons size the operative temperature of the charge must be at least 4450° F., and for best results higher, preferably at least 5200° F., and in some cases as high as 5400° F. The manner in which the charges are formulated to achieve the operative temperature will be explained in detail and exemplified by illustrative examples hereinafter.

Second, the reactants must be charged in such a manner that the heat of reaction is generated at a regulated rate sufficient to bring the reactants and reaction products to and maintain them at the operative temperature. This entails minimizing loss of heat by radiation and convection during the reaction.

Third, to prevent excessive loss of heat by radiation and convection, the reactor, or kiln, must be thermally insulated and must be of such size and construction relative to the charge fed to it as also to minimize loss of heat by conduction.

Fourth, it is essential that a reducing condition must exist at the completion of the reaction. That is, there must remain an excess of free calcium carbide and metallic aluminum, and desirably a small amount of carbon. Free iron and free manganese should also remain if they are present in the charge materials.

Some tungsten white ores, such as scheelite, are not able to produce enough heat to reach the operative temperature by reaction with the calcium carbide and aluminum. In such a case the necessary thermochemical conditions are obtained by including in the charge compounds containing iron and oxygen, such as black ores, ferric oxide or magnetic iron oxide, together with additional equivalent amounts of metallic aluminum. Reaction is initiated in the manner usual with thermite reactions.

To reach and maintain the conditions necessary for successful operation described above requires precise planning of the reactor charge, particularly when diverse types of tungsten bearing ores, ore concentrates and other tungsten sources are to be used. I have discovered that to insure success the proportions of calcium carbide, aluminum metal and added iron oxide (if any) must be held within certain limits with respect to the quantity of tungsten material charged. These limits have been determined and are given in the tabulation which follows later. Furthermore, I have discovered that to achieve optimum yield of macrocrystalline tungsten monocarbide from various ores, concentrates, mixtures thereof and other tungsten sources it is necessary to control the proportions of calcium carbide, aluminum metal and added iron oxide (if any) even within the limits referred to above.

A small amount of free carbon may be desirable because in large charges there may be localized zones of the crystal mass resulting from the reaction where the $CaC_2$ may not have fully converted the W to WC with the result that $W_2C$ or $Fe_3W_3C$, which adversely affect the quality of hard metal products, may appear locally. By using a limited amount of carbon in the charge such factors are minimized with more uniform conversion of W to macrocrystalline tungsten monocarbide (WC).

In general, the composition of the black tungsten ores is such that, in contrast to the white ores, they should upon reaction with aluminum theoretically produce heat sufficient to convert the tungsten content of the charge in the presence of $CaC_2$ to single phase WC. Practically, however, some additional thermite-derived heat is necessary to heat up the reactor and to compensate for heat loss during reaction so that in the case of black ores there must usually be included in the charge some amount of iron oxide above that of the ore together with an equivalent amount of metallic aluminum. This case may be exemplified by ferberite. Additional amounts of aluminum and $CaC_2$ are usually required for white ores of tungsten.

Economical operation requires that substantially all of the tungsten in the charge be converted to WC. From my observation of the crystal masses resulting from numerous charges it appears that $CaWO_4$ is converted to WC and CaO; that $Fe(Mn)WO_4$ goes to WC, Fe, and Mn; that $CaC_2$ results in WC and CaO, with the excess $CaC_2$ noted above; that Al becomes $Al_2O_3$, with an excess of metallic Al as noted above, and that oxygen is used in forming CaO and $Al_2O_3$ although some CO may be formed during the reaction.

Although as stated above, the operative temperature has not been accurately observed, development of the necessary temperature is susceptible to calculation which, in my experience, leads to satisfactory production, in accordance with the objects of the invention, of macrocrystalline tungsten monocarbide from a wide variety and proportions of tungsten bearing ores and concentrates, and other tungsten sources such as those mentioned above. This calculation is based upon the stoichiometry of the reaction series believed to be involved with the various tungsten sources and the thermochemical result of such stoichiometry. The calculation develops what I term the operative temperature which must be held above the aforementioned specified minimum value to achieve optimum results.

Determination of this operative temperature is illustrated in Cases 1, 2 and 3 which follow, and it is based upon the following information:

(a) Proportions and chemical analyses of the components to be charged.

(b) Heats of formation are taken from "Selected Values of Chemical Thermodynamic Properties," Circular 500, National Bureau of Standards, issued February 1, 1952.

(c) Heat content data: These data are from either "Contributions to the Data on Theoretical Metallurgy" by K. K. Kelley, Bulletin 476, U.S. Government Printing Office, 1949, or from "Metals Reference Book," Vol. II, 2nd Ed. (N.Y. 1955) p. 608, referred to in the examples as Smithells.

(d) Heat of fusion data: Kirk and Othmer "Encyclopedia of Chemical Technology," Vol. II, p. 836 (N.Y. 1948); Rossini et al. "Selected Values of Chemical Thermodynamic Properties," pp. 731, 778, U.S. Government Printing Office, 1952; Sims "Electric Furnace Steel Making," Vol. II, p. 45 (N.Y., 1963).

Figure 1:
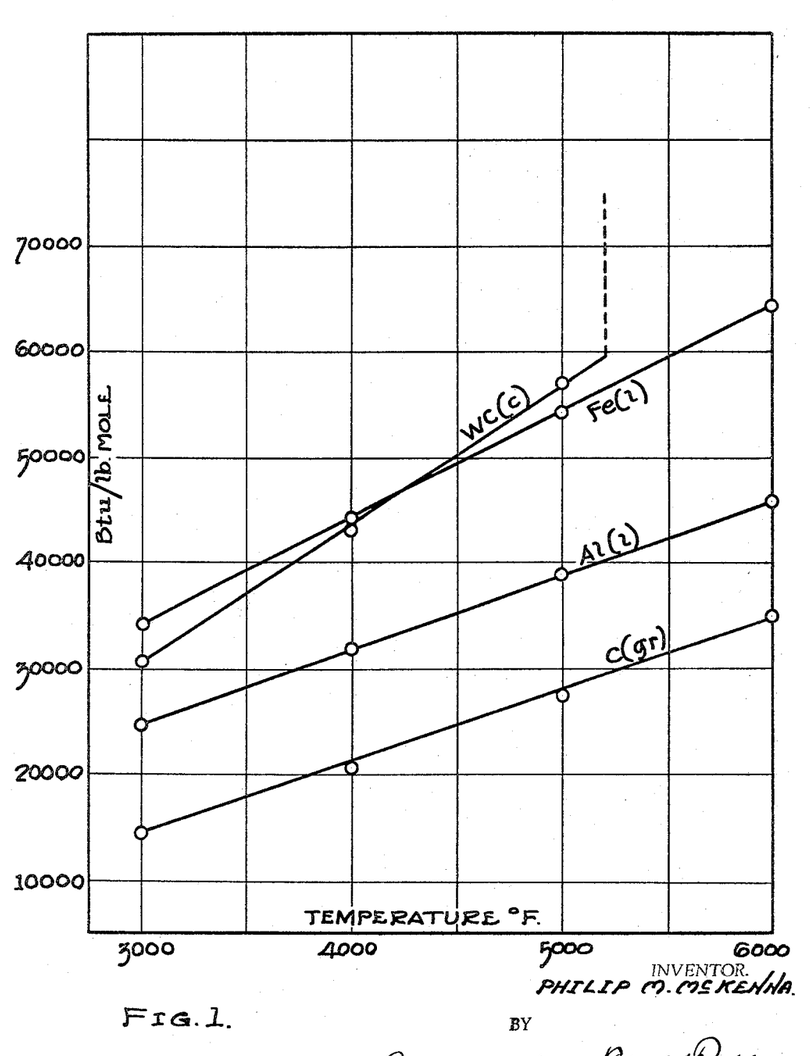
FIGS. 1 to 4 are graphs relating the heat contents of the reactants and their reaction products, including WC, to temperature, for use in planning reaction charges for performing the invention.
Figure 2:
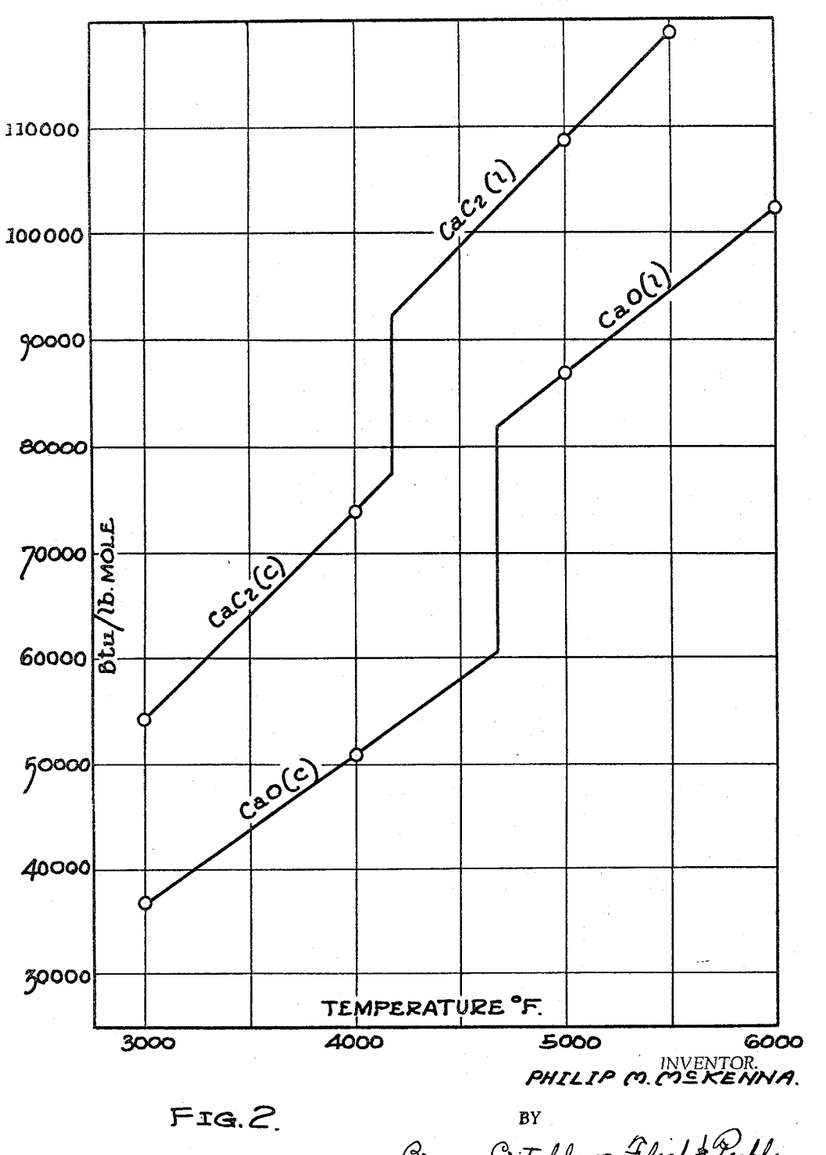
Figure 3:
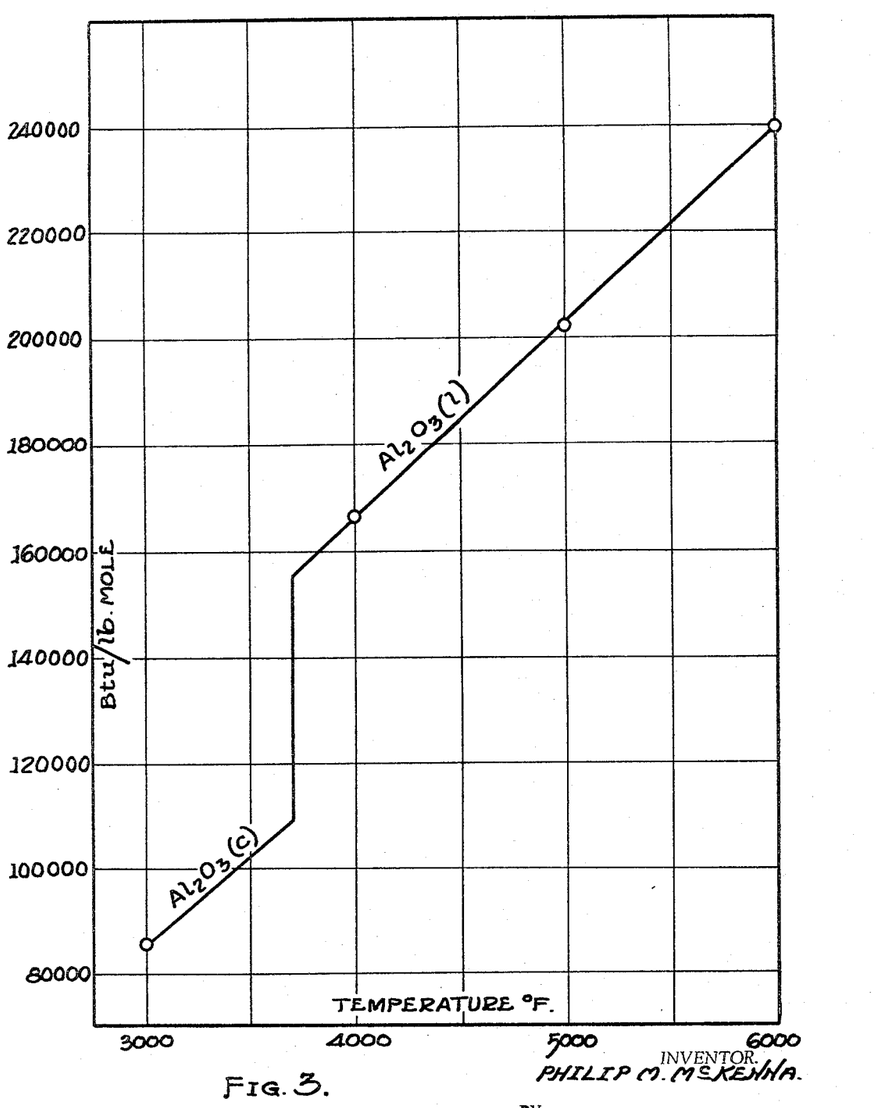
Figure 4:
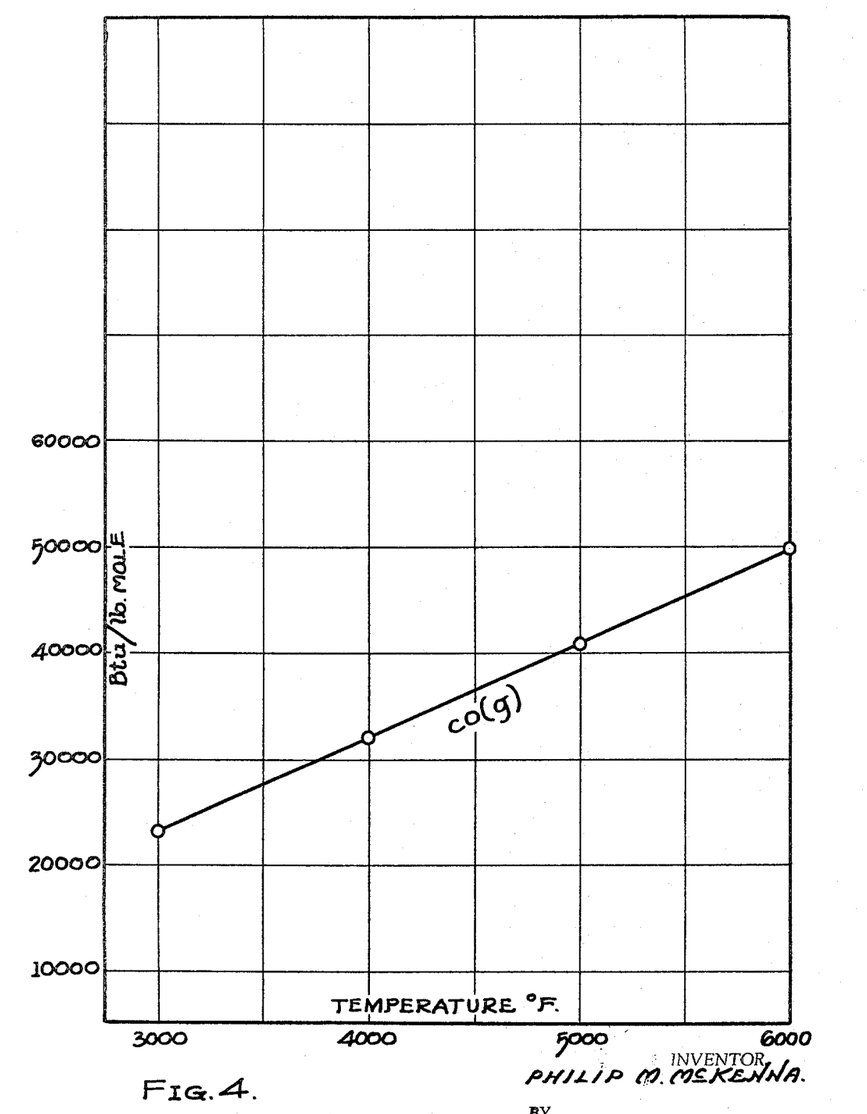

The heat contents used in the calculations of the following examples are plotted in FIGS. 1 to 4.

The temperature levels at which the heat content data were applied in the following calculations were selected to plan a charge to give a particular temperature (e.g., above 5100° F.) so that the desired result would be obtained. In some cases the temperatures of the calculations were above those at which the basic experimental data of the references were taken, and here extrapolation was used. Although the accuracy of such an extrapolation may be subject to question, nevertheless, I have found that use of my calculated operative temperatures based upon these extrapolated heat content data will lead to satisfactory production of macrocrystalline tungsten monocarbide in my present process. In other words, regardless of the actual temperature, the use of the data to plan a particular charge to give a particular operative temperature (e.g., 5100° F.) will give the desired result.

The calculations are based upon the stoichiometry of the reactions believed to take place and upon the use of charge components of conventional purity so that no special allowance needs to be made for the presence of inert impurities. For example, when metallic Al of at least 90% purity, $CaC_2$ of at least 80% purity, and iron oxides with more than 24% oxygen are used, no special allowance need be made for heat absorption by inert impurities. Also, when the tungsten bearing ores or concentrates contain on an average 50 to 60 weight percent tungsten by analysis no special allowance need be made in the calculation for the presence of inert impurities. However, one may use charge materials of higher or lower purities by compensating for the heat effect of impurities by appropriately changing the proportions of the constituents participating in the thermite reaction.

Case 1—All tungsten charged as $CaWO_4$ (scheelite)

Basis of calculation—100 lb. atoms of W charged as $CaWO_4$.
Calculated operative reaction temperature—5100° F.
Excess of $CaC_2$ in the charge—40%
Excess of metallic Al in the charge—crystal mass at completion of reaction is to contain 0.5 lb. atom of metallic Al per lb. atom of W charged.
Using the stoichiometric relationship upon which my calculated operative reaction temperature is based and making provision for the excess of $CaC_2$ and metallic Al stated above I arrive at the following equations:

(1) $100\ CaWO_4 + 70\ CaC_2 + 217\ Al =$
$100\ WC + 150\ CaO + 20\ CaC_2 + 83.5\ Al_2O_3 + 50\ Al$

Exothermic heat of reaction must be sufficient to reach the calculated reaction temperature of 5100° F., and I accomplish this by use of a charge based upon the following thermite reaction:

(2) $\qquad 8\ Al + 3\ Fe_3O_4 = 4\ Al_2O_3 + 9\ Fe$

The ratio of this thermite heating charge (2) to the foregoing charge (1) which will yield the operative temperature of 5100° F. must now be determined. To calculate this:

Let M = lb. atoms Al in thermite reaction (2) per 100 lb. atoms of W in charge (1).
Substituting in Equation 2 gives:

(3) $\qquad M\ Al + \tfrac{3}{8}M\ Fe_3O_4 = \tfrac{1}{2}M\ Al_2O_3 + \tfrac{9}{8}M\ Fe$ Equations 1 and 3 are then added and the exothermic heat of reaction is calculated—

Heat of formation of reactants:

$CaWO_4 = 100 \times 392.5 = 39,250$ kcal.
$CaC_2 = 70 \times 15.0 = 1,050$ kcal.
$Fe_3O_4 = \tfrac{3}{8}M \times 267.0 = 100M$ kcal.
  Total, kcal. $= 40,300 + 100M$.

Heat of formation of products:

$WC = 100 \times 9.1 = 910$ kcal.
$CaO = 150 \times 151.9 = 22,785$ kcal.
$CaC_2 = 20 \times 15.0 = 300$ kcal.
$Al_2O_3 = 83.5 \times 399.1 = 33,325$ kcal.
$Al_2O_3 = \tfrac{1}{2}M \times 399.1 = 200M$ kcal.
  Total kcal. $= 57,320 + 200M$.

Exothermic heat of reaction in kcal. $= 17,020 + 100M$.
Exothermic heat of reaction in Million B.t.u.
  $= 30.636 + .180M$.
Heat required to raise the reaction products to 5100° F. is now calculated:

$WC = 100 \times 58,200 = 5.820$ million B.t.u.
$CaO = 150 \times 88,500 = 13.275$ million B.t.u.
$CaC_2 = 20 \times 110,800 = 2.216$ million B.t.u.
$Al_2O_3 = 83.5 \times 207,000 = 17.285$ million B.t.u.
$Al_2O_3 = \tfrac{1}{2}M \times 207,000 = 0.1035$ million B.t.u.
$Al = 50 \times 39,400 = 1.970$ million B.t.u.
$Fe = \tfrac{9}{8}M \times 55,300 = 0.0622$ million B.t.u.
  Total in million B.t.u. $= 40.566 + 0.1657M$.

The exothermic heat of reaction is then equated with the heat required to raise the reaction products to 5100° F.:

$$30.636 + 0.180M = 40.566 + 0.1657M$$

in which $M = 694$

Substituting this value in Equation 3 and adding Equation 1 gives:

(4)
$100\ CaWO_4 + 70\ CaC_2 + 911\ Al + 260\ Fe_3O_4 = 100\ WC$
$+ 150\ CaO + 20\ CaC_2 + 431\ Al_2O_3 + 50\ Al + 781\ Fe$

From Equation 4 it is possible to calculate the following weight ratios for the charge:

(5) $\qquad CaC_2$ to W $$\left(\frac{70 \times 64.1}{100 \times 183.86}\right) = 0.244$$

(6) $\qquad$ Al to W $$\left(\frac{911 \times 26.98}{100 \times 183.86}\right) = 1.337$$

(7) $\qquad Fe_3O_4$ to W $$\left(\frac{260 \times 231.5}{100 \times 183.86}\right) = 3.274$$

Case 2—All tungsten charged as $FeWO_4$ (ferberite)

Basis of calculation—100 lb. atoms of W charged as $FeWO_4$

Excess of CaC₂ and metallic Al—the same as Case 1
Calculated operative reaction temperature—5100° F.
Stoichiometric relationship similar to Equation 1 and including excess of CaC₂ and Al:

(8) $100\ FeWO_4 + 70\ CaC_2 + 283\ Al = 100\ WC + 100\ Fe + 50\ CaO + 20\ CaC_2 + 117\ Al_2O_3 + 50\ Al$

Thermochemical calculations for Equation 8 similar to those made for Case 1 show that the exothermic heat of reaction is great enough to raise the reaction products above 5100° F. without use of thermite reaction (2).

From Equation 8 the following weight ratios may be calculated for the charges:

(9) $CaC_2$ to W:
$$\left(\frac{70 \times 64.1}{100 \times 183.86}\right) = 0.244$$

(10) Al to W:
$$\left(\frac{283 \times 26.98}{100 \times 183.86}\right) = 0.415$$

(11) Added Fe₃O₄ to W: none required

Case 3—50% of tungsten charged as CaWO₄ (scheelite) and 50% as FeWO₄ (ferberite)

Basis of Calculation:
  50 lb. atoms of W charged as CaWO₄
  50 lb. atoms of W charged as FeWO₄
Calculated operative reaction temperature—5100° F.
Excess of CaC₂ and metallic Al—the same as Case 1
Stoichiometric relationship with provision for excess of CaC₂ and metallic Al:

(12) $50\ CaWO_4 + 50\ FeWO_4 + 70\ CaC_2 + 250\ Al = 100\ WC + 100\ CaO + 20\ CaC_2 + 100\ Al_2O_3 + 50\ Al + 50\ Fe$

The thermite heating charge is given by Equation 3 of Case 1.
Equations 12 and 3 are then added and the exothermic heat of reaction is calculated:
Heat of formation of reactants:

$CaWO_4 = 50 \times 392.5 = 19{,}625$ kcal.
$FeWO_4 = 50 = 50 \times 274.1 = 13{,}705$ kcal.
$CaC_2 = 70 \times 15.0 = 1{,}050$ kcal.
$Fe_3O_4 = \tfrac{2}{3}M \times 267.0 = 100M$ kcal.
  Total, kcal. $34{,}380 + 100M$.

Heat of formation of products:

$WC = 100 \times 9.1 = 910$ kcal.
$CaO = 100 \times 151.9 = 15{,}190$ kcal.
$CaC_2 = 20 \times 15.0 = 300$ kcal.
$Al_2O_3 = 100 \times 399.1 = 39{,}910$ kcal.
$Al_2O_3 = \tfrac{1}{2}M \times 399.1 = 200M$ kcal.
  Total $56{,}310 + 200M$ kcal.

Exothermic heat of reaction in kcal. $= 21{,}930 + 100M$.
Exothermic heat of reaction in million B.t.u. equals $39.474 + 0.1800M$.

Heat required to raise the reaction products to 5100° F. is now calculated:

$WC = 100 \times 58{,}200 = 5.820$ million B.t.u.
$CaO = 100 \times 88{,}500 = 8.850$ million B.t.u.
$CaC_2 = 20 \times 110{,}800 = 2.216$ million B.t.u.
$Al_2O_3 = 100 \times 207{,}000 = 20.700$ million B.t.u.
$Al_2O_3 = \tfrac{1}{2}M \times 207{,}000 = 0.1035M$ million B.t.u.
$Al = 50 \times 39{,}400 = 1.970$ million B.t.u.
$Fe = 50 \times 55{,}300 = 2.765$ million B.t.u.
$Fe = \tfrac{2}{3}M \times 55{,}300 = 0.0622M$ million B.t.u.
  Total in million B.t.u. $42.321 + 0.1657M$.

As in Case 1, the exothermic heat of reaction is equated with the heat required to raise the reaction products to 5100° F.

$39.474 + 0.1800M = 42.321 + 0.1657M$ in which $M = 199$.

Substituting this value in Equation 3 and adding Equation 12 gives:

(13) $50\ CaWO_4 + 50\ FeWO_4 + 70\ CaC_2 + 449\ Al + 74.7\ Fe_3O_4 = 100\ WC + 100\ CaO + 20\ CaC_2 + 200\ Al_2O_3 + 50\ Al + 274\ Fe$

From Equation 13 weight ratios for the charge are calculated as follows:

(14) $CaC_2$ to W
$$\left(\frac{70 \times 64.1}{100 \times 183.86}\right) = 0.244$$

(15) Al to W
$$\left(\frac{449 \times 26.98}{100 \times 183.86}\right) = 0.659$$

(16) $Fe_3O_4$ to W
$$\left(\frac{74.7 \times 231.5}{100 \times 183.86}\right) = 0.941$$

In the case of manganese-containing ores, such as wolframite, calculations based upon iron-containing ores can apply directly because the high temperature heat contents of manganese-containing ores are so similar to those of iron-containing ores.

Based upon calculations of the type shown above and upon successful operation of many large scale runs of the process I am able to establish the range of operating limits applicable to scheelite and wolframite and other tungsten ores, and mixtures thereof, as well as artificial tungsten compounds as follows:

| Tungsten Bearing Charge Stock | Minimum | Maximum |
|---|---|---|
| W, wt. percent, average, by analysis | 24 | 80 |
| Weight ratio of CaC₂ to W | 0.20 to 0.40 | |
| Weight ratio of Al to W | 0.35 to 1.60 | |

Weight ratio of added iron oxide (30% average oxygen) to W up to 3.5

In addition to the use of natural tungsten ores or minerals, or their concentrates, there may with advantage be used what may be termed synthetic, or "artificial," tungsten minerals. For example, artifiical scheelite may be precipitated by adding calcium chloride to a crude sodium tungstate solution made from natural scheelite.

I have found that as much as 3 percent of molybdenum may be present in the WC lattice while still providing hard cemented carbide compositions of excellent physical properties in sintered tools, the chief use contemplated for the macrocrystalline WC of my invention as a main ingredient of such cemented hard metal composition in which the hard metal is mixed with an auxiliary metal, such as cobalt, in minor proportion, examples being Carboloy, Widia, Kennametal, and Firthite.

Similarly, artificial ferberite may be made by precipitation of an aqueous sodium tungstate solution with a solution of a ferrous salt, such as the sulfate or the chloride. Use of a ferric salt yields ferric tungstate, $Fe_2O_3(WO_3)_3$, which contains a higher percentage of oxygen than is present in ferberite. This precipitation gives an easily separable ferric tungstate which when dried by heating forms coherent nodules which yield more heat when reacted with metallic aluminum and calcium carbide than results from similar treatment of a similar amount of ferberite. This is desirable because it permits the attainment of the temperature necessary for formation of macrocrystalline WC or W(Mo)C from lower grade ore concentrates which have associated with them more gangue to be melted. Such lower grade concentrates suited for making ferric tungstate are available at a lower cost per unit because of the costs of upgrading them to standard higher concentrations, for instance the 60 percent WO₃ grade, or higher. Thus a special benefit of this invention is that there may be substituted for all or part of the black ore ingredient artificial ferric tungstate whereby it becomes possible to attain the necessary minimum temperature of 4450° F. with formation of macrocrystalline WC despite the loss of heat used in melting more slag from the gangue of non-reacting impurities in the low grade concentrates.

In cases where the heat output of a desired charge may be too low for the purpose of the reaction the heat output may be increased by including in the charge an appropriate amount of an oxidizing agent, such as potassium permanganate or potassium perchlorate, or by adding ferric nitrate with appropriate increase in the amount of metallic aluminum.

To facilitate the operation and to permit regulation of the reaction the charge is divided into portions, desirably of substantially uniform weight, which are disposed in Al containers, suitably bags, for progressive charging and maintenance of reaction. Thin aluminum sheet is preferred for this purpose; the reflectivity of Al maintains the integrity of the bags against heat until they reach the reaction zone.

The reaction is performed in a kiln adapted to withstand the temperature reached and to be unaffected by the reaction products. Also, it must be adapted to minimize heat losses, as noted above. Preferably the inner walls are of graphite slabs backed by insulating carbon, and the hearth may consist of coke and charcoal resting upon insulating carbon. The outer walls are constructed from high temperature refractory bricks. Most suitably the top opening is partially covered also by high temperature refractory bricks and is provided with a central opening for charging and for escape of reaction gases; thus further cutting down heat losses.

In the practice of the invention the reactor is preheated to, for example, about 1400° F. to 1500° F. and bags of the ore charge are introduced together with one or more bags of starter composition of a mixture of finely divided aluminum and rouge containing an igniter mixture of, for example, potassium perchlorate and sulfur together with an electric squib or fuse. The starter charge is ignited, and when a pool of molten iron has formed bags of the ore charge are added progressively at a rate sufficient to maintain the reaction heat with minimizing of adverse heat losses and excessive boiling of the kiln contents. An important factor in achieving successful operation of my new method is the progressive feeding of the charge to the kiln just mentioned. Unsatisfactory results attend attempts to statically fire single charges, as experience has shown. Progressive loading is advantageous, however, for a variety of reasons. Importantly, it makes it possible for the operator to control the reaction rate, makes for optimum use of the reaction heat, and avoids having the reaction go out of control. By such progressive feeding the rate of addition of the bags of ore charge can be varied as need be to obtain maximum use of the reaction heat and maximum recovery of the W values as crystalline WC. Another advantage as compared with firing a single charge is that as the individual bags of ore charge enter the kiln they absorb heat from the highly heated gases leaving the kiln and are further heated upon contact with the hot slag in the upper zone of the kiln, whereby maximum use of the heat of reaction is utilized. At the end of the reaction the kiln and its contents are allowed to cool with formation of a lower heavier layer of crystal mass containing about 50 weight percent of WC, and an upper slag layer. The crystal mass contains also most of the metallic iron, manganese and excess metallic aluminum together with slight amounts of lime, silica and other gangue impurities. The slag is separated from the crystal mass which is then crushed to lumps of about 20 mesh size which are water washed to remove $CaC_2$ and any other water soluble impurities. The crystalline WC is then recovered by dissolving free iron, manganese and aluminum from the lumps with an aqueous solution of ferric chloride and hydrochloric acid, which reduces the iron to 0.5 to 2 percent. Suitably this solvent is a solution of 1.5 to 1.8 gram formula weights of $FeCl_3$ per liter acidified with HCl. Alternatively, mixtures of $H_2SO_4$ and HCl may be used. Then the iron can be taken down to about 0.2 percent with a mixture of HCl, $HNO_3$ and HF. The product is essentially WC in single phase macrocrystalline form. It may contain up to 1 percent of TiC, NbC and TaC from the ores, which does not adversely affect its utility for most purposes.

A mark of successful operation is the ease of Fe removal from the crystal mass, for if the process is run properly the Fe will be in metallic form and it will dissolve readily in acid to leave WC of acceptably low Fe content. If the charge is not properly proportioned and precautions are not observed as to temperature and heat losses, $W_2C$ and $Fe_3W_3C$, and perhaps other undesirable phases, will be formed and such material is neither susceptible to acid treatment nor is it acceptable for making cemented hard metal carbide tools. Of course, crystalline WC can be recovered from the crystal mass by means other than the practice just described.

The invention may be further described and understood with reference to the following actual typical example illustrative of the results that have been obtained in producing about 50,000 pounds of WC from about 150,000 pound charges completely reacted in about one hour.

This example involved 54,120 lbs. of wolframite ores containing from 53.45 to 60.09% W, and 27,880 lbs. of scheelite ores containing from 48.63 to 54.23% W, together with 8200 lbs. of plant residues of 50 to 93% W resulting from recovery of WC from the WC crystal mass produced by the practice described above.

The charge included also 24,487 lbs. of aluminum chips, wire scrap and the 4971 bags used, 13,342 lbs. of $CaC_2$, 1677 lbs. of mill scale, 17,618 lbs. of iron oxide pellets, and 2105 lbs. of carbon.

The charge, in which the ratio of the ores was about 66% wolframite to 34% scheelite, was thoroughly mixed and placed in about 30 lb. amounts in aluminum foil bags weighing about 5 ounces each which were closed by a stapler.

Ten percent of the total charge was composed of:

| | Lbs. |
|---|---|
| Al chips | 2,205 |
| Mill scale | 1,624 |
| $CaC_2$ | 1,295 |
| Wolframite | 5,412 |
| Scheelite | 2,788 |
| Carbon | 26 | for the First Feed to the kiln.

The Second Feed to the kiln, 45% of the total charge was:

| | |
|---|---|
| Al chips | 7,427 |
| Al wire | 3,000 |
| Iron oxide pellets | 8,730 |
| $CaC_2$ | 5,793 |
| Wolframite | 24,354 |
| Scheelite | 12,546 |
| Plant residues | 4,100 |
| Carbon | 1,000 |

The remaining 45% of the total charge, constituting the Third Feed was composed of:

| | |
|---|---|
| Al chips | 6,839 |
| Al wire | 3,236 |
| Mill scale | 53 |
| Iron oxide pellets | 8,888 |
| $CaC_2$ | 6,254 |
| Wolframite | 24,354 |
| Scheelite | 12,546 |
| Plant residues | 4,100 |
| Carbon | 1,000 |

The kiln was preheated to 1400° F. Feeding of bags of the First Feed and of starter mix was begun, and the starter mix was ignited by a fuse lighted as it started on its way to the kiln. With the reaction well under way the bags of Second Feed charge were fed to the kiln progressively, followed by regulated feeding of the Third Feed, all at a rate to maintain uniform rate of reaction with avoidance of excessive boiling in the kiln.

The total firing time was 73 minutes, all the actual reaction time was 69 minutes. From this charge 50,800 lbs. of crystalline WC was recovered after leaching as described above.

The fresh aluminum bags of charge material enter the kiln through its top opening, and they are preheated by the hot gases leaving the kiln as well as by radiation from the incandescent top slag layer. When the bags reach the slag layer they are further heated by direct contact with it and brought to reaction temperature. By this process part of the heat of the slag slayer is absorbed by the incoming charge and is thus retained regeneratively for use in the process. According to observations made during the practice of the process WC crystals form practically instantaneously and sink immediately forming the crystal mass at the bottom of the kiln, while the lighter reaction products and inert ingredients rise and form an upper layer of molten slag.

Because of the dynamic character of this process, the rate at which the ingredients are charged is critical. As stated hereinabove, the charging rate must be fast enough to compensate for heat losses and to maintain the reaction temperature, but the rate must not be so rapid as to cause excessive vaporization and boiling.

Other factors influence the desired rate of charge. In the example given, the wolframite and scheelite ore concentrates were of the purity ordinarily available at the present time, containing from 48.63 to 60.09% tungsten, although there was a small amount of low grade scheelite which contained only 29.25% W. The impurities of the wolframite and scheelite ore concentrates together with the auxiliary reactants contain substantial amounts of calcium, aluminum and silicon, and the resultant formation of calcium aluminates and calcium aluminum silicates has the effects of reducing the melting point and lowering the viscosity of the slag. In such a case, settling of the WC crystals is facilitated, and a relatively rapid charge rate can be used. With other charging stocks, however, different slag viscosities and densities will be encountered, and this will have an effect upon the formation rate and settling rate of the crystalline WC, requiring a different charging rate to achieved optimum results. Thus to achieve optimum results the operator must control the progress of the reaction to meet such varying conditions. In my dynamic process this is accomplished by progressive feeding of the charge, which permits both the rate and proportion of the charge to be varied or adjusted at any given time during the reaction at the will of the operator.

In contrast, production of macrocyrstalline WC was attempted using a fixed or static charge in which all ingredients were placed inside the kiln prior to ignition. This static procedure allowed no opportunity to control or vary the reaction rate to obtain optimum results for the charge material used, and the results to be had with the yield and quality of crystalline WC produced were markedly inferior to the dynamic process of this application.

Although the invention has been exemplified by the treatment of a mixture of scheelite and wolframite ores, it will be understood that by similar application of the principles explained above in detail it is equally applicable to white ores, to black ores, and to mixtures of both types of ores as well as to artificial tungstates and other related tungsten sources. Likewise, various modifications of operating procedure and related factors will be understood by those familiar with the metallurgical art.

According to the provisions of the patent statutes, I have explained the principle of my invention and have described what I now consider to represent its best embodiment. However, I desire to have it understood that, within the scope of the appended claims, the invention may be practiced otherwise than as specifically described.

I claim:

1. That method of making crystalline tungsten monocarbide from a compound of the group consisting of tungstate ores, tungsten minerals and artificially produced tungstates, comprising providing a reaction charge of (1) at least one of said compounds, (2) calcium carbide, (3) particulate metallic aluminum, and (4) up to 3.5 pounds of iron oxide per pound of tungsten in the charge, proportioning said charge to provide upon ignition a self-sustaining exothermic reaction to develop a calculated operative temperature within the charge of at least 4450° F. with production of a body of crystalline tungsten monocarbide containing residual calcium carbide and metallic aluminum in amounts to provide a reducing condition at the end of the reaction, disposing a portion of the charge in a kiln and igniting it, progressively feeding the rest of the charge into the kiln at a rate to maintain continuous smooth reaction, separating said crystal body from slaggy products of reaction, and recovering crystalline tungsten monocarbide from it.

2. A method according to claim 1, in which the charge contains at least one of the ores scheelite, ferberite, hubnerite and wolframite.

3. A method according to claim 1, the ore of said charge being a mixture of scheelite and wolframite.

4. A method according to claim 1, said artificial tungstates being compounds of tungsten with oxygen and at least one metal of the group iron, manganese, copper and molybdenum.

5. That method of making crystalline tungsten monocarbide from a compound of the group consisting of tungstate ores, tungsten minerals and artificially produced calcium and iron tungstates, comprising providing a reaction charge of (1) at least one of said compounds, (2) calcium carbide, (3) metallic aluminum in particulate form, and (4) up to 3.5 pounds of iron oxide per pound of tungsten in the charge, proportioning said charge to provide upon ignition a self-sustaining exothermic reaction to develop a calculated operative temperature within the charge of at least 4450° F. to 5400° F. with production of a body of crystalline tungsten monocarbide containing residual calcium carbide and metallic aluminum in amounts to provide a reducing condition at the end of the reaction, dividing the charge into a plurality of portions disposed in aluminum containers, feeding a portion of said containers into a kiln heated to at least about 1400° F. and igniting the charges, progressively feeding the rest of said containers into the kiln at a rate to maintain controlled reaction, separating said crystal body from slaggy products of reaction, and recovering crystalline tungsten monocarbide from it.

6. That method of making crystalline tungsten monocarbide from a compound of the group consisting of tungstate ores, tungsten minerals and artificially produced calcium and iron tungstates, comprising providing a reaction charge of (1) at least one of said compounds containing from about 24 to 80 weight percent tungsten by analysis, (2) from 0.2 to 0.4 pound of calcium carbide per pound of tungsten in the charge, (3) from about 0.35 to 1.6 pounds of particulate metallic aluminum per pound of tungsten in the charge, and (4) up to 3.5 pounds of iron oxide of average 30 percent oxygen content per pound of tungsten in the charge, proportioning said charge to provide upon ignition a self-sustaining exothermic reaction to develop a calculated operative temperature within the charge of at least 4450° F. to 5400° F. with production of a body of crystalline tungsten carbide containing residual calcium carbide and metallic aluminum in amounts to provide a reducing condition at the end of the reaction, dividing the charge into a plurality of portions disposed in aluminum containers, feeding some of said containers and igniting their contained charges, progressively feeding the rest of said containers into the kiln at a rate to maintain controlled reaction with production of said body of tungsten monocarbide, separating said body from slaggy products of reaction, and treating said body to remove non-carbide substances from it and recover crystalline tungsten monocarbide.

7. A method according to claim 6, the kiln being preheated to at least about 1400° F.

8. A method according to claim 6, in which the charge contains at least one of the ores scheelite, ferberite, hubnerite and wolframite.

9. A method according to claim 6, said artificial tungstate being ferric tungstate, $Fe_2O_3(WO_3)_3$.

10. That method of making crystalline tungsten monocarbide from a compound of the group consisting of tungstate ores, tungsten minerals and artificially produced calcium and iron tungstates, comprising providing a reaction charge of (1) at least one of said compounds, (2) calcium carbide, (3) metallic aluminum in particulate form, and (4) up to 3.5 pounds of iron oxide per pound of tungsten in the charge, proportioning said charge to provide upon ignition a self-sustaining exothermic reaction to develop a calculated operative temperature within the charge of at least 4450° F. to 5400° F. with production of a crystal mass of tungsten monocarbide containing residual calcium carbide and metallic aluminum in amounts to provide a reducing condition at the end of the reaction, dividing the charge into a plurality of portions, feeding individual portions into a kiln initially heated to at least about 1400° F. and initiating reaction, continuing to feed said portions into the kiln at a rate controlled by the operator to vary the dynamic reaction, separating said crystal mass from slagged products of reaction, and recovering crystalline tungsten monocarbide from it.

References Cited

UNITED STATES PATENTS

| 2,158,520 | 5/1939 | Meyer | 23—208 |
| 2,178,773 | 11/1939 | Benner et al. | 23—208 |
| 2,370,610 | 2/1945 | Adeline | 75—27 |
| 2,529,778 | 11/1950 | McKenna | 23—208 |
| 2,532,295 | 12/1950 | Gardner | 23—208 |
| 2,886,454 | 5/1959 | Todd | 23—208 |
| 3,106,456 | 10/1963 | Ripley | 23—208 |

FOREIGN PATENTS

| 729,162 | 5/1955 | Great Britain. |
| 740,547 | 11/1955 | Great Britain. |

OTHER REFERENCES

Hougen et al.: Chemical Process Principles, Part I, 2d ed., Wiley, N. Y., 1958, pp. 297 and 298.

OSCAR R. VERTIZ, *Primary Examiner.*

G. T. OZAKI, *Assistant Examiner.*